United States Patent [19]

Ritz et al.

[11] 4,373,078

[45] Feb. 8, 1983

[54] PROCESS FOR THE MANUFACTURE OF HARDENABLE COPOLYMERS AND THE USE THEREOF

[75] Inventors: Jürgen Ritz, Mainz; Hannes Fischer, Taunusstein; Helmut Plum, Übach-Palenberg, all of Fed. Rep. of Germany

[73] Assignee: Hoechst Aktiengesellschaft, Frankfurt am Main, Fed. Rep. of Germany

[21] Appl. No.: 294,383

[22] Filed: Aug. 19, 1981

[30] Foreign Application Priority Data

Aug. 22, 1980 [DE] Fed. Rep. of Germany ....... 3031655

[51] Int. Cl.³ ............................................ C08F 20/26
[52] U.S. Cl. .................................... 526/317; 525/374; 526/320
[58] Field of Search ............................... 526/317, 320

[56] References Cited

U.S. PATENT DOCUMENTS 3,471,457 10/1969 Vasta .................................. 526/320

Primary Examiner—Paul R. Michl
Attorney, Agent, or Firm—Hammond & Littell, Weissenberger and Muserlian

[57] ABSTRACT

Process for the manufacture of hardenable copolymers by the polymerization of unsaturated esters with unsaturated polymerizable monomers containing no free COOH groups, wherein an olefinically unsaturated diester containing OH groups is used as the unsaturated ester, said diester being obtained by reacting olefinically unsaturated dicarboxylic acids or the anhydrides thereof with a polyhydric alcohol and a monoepoxide compound in one or more steps, characterized in that the copolymerization of the diesters with monomers which contain no free COOH groups is carried out in the presence of copolymerizable monomers containing free COOH groups, and the use of the copolymers as hardenable binders for lacquers and/or coating compositions.

10 Claims, No Drawings

PROCESS FOR THE MANUFACTURE OF HARDENABLE COPOLYMERS AND THE USE THEREOF

German Offenlegungsschrift 24 10 512 describes the reaction of an unsaturated dicarboxylic acid, e.g. maleic acid, with a polyhydric alcohol, e.g. a diol or triol, and in a second step the further reaction of the intermediate product with an epoxide compound in the form of a glycidyl ester, glycidyl ether or alkylene oxide. The lower molecular compounds obtained in the second step can be hardened after being mixed with an amine resin at elevated temperature, e.g. for 30 minutes at 120° to 180° C., and in this way can be processed to form coatings. It is not possible to cross-link these products at ambient temperature, owing to the fact that the molecular weight of the product to be hardened is too low. Only thermal hardening is envisaged. For this reason, the range of applications for these binders is limited. It was therefore desirable to extent the range of applications of these kinds of binders for coatings.

A process for preparing hardenable copolymers by polymerisation of olefinically unsaturated esters with unsaturated monomers containing no free COOH groups has already been proposed, wherein the unsaturated ester used is an olefinically unsaturated diester containing OH groups, obtained in a previous first stage by reacting an olefinically unsaturated dicarboxylic acid or the anhydride thereof with a polyhydric alcohol, to form a half-ester with free OH groups and further reacting the half-ester, in a second step, with a monoepoxide compound. According to a modified version of this process, the olefinically unsaturated diester containing OH groups may be produced beforehand in a single stage by reacting an anhydride of the olefinically unsaturated dicarboxylic acid, a monohydric alcohol and a monoepoxide compound. The hardenable reaction products obtained according to both embodiments are isolated and/or used as hardenable binders for lacquers and/or coatings, and are hardened by the action of a curing agent. These processes and the products prepared by them have proved satisfactory. However, there was a need to improve the process further.

According to one aspect, the invention provides a process for the manufacture of hardenable copolymers by the polymerisation of unsaturated esters with unsaturated polymerisable monomers containing no free COOH groups, wherein an olefinically unsaturated diester containing OH groups is used as the unsaturated ester, said diester being obtained by reacting olefinically unsaturated dicarboxylic acids or the anhydrides thereof with a polyhydric alcohol and a monoepoxide compound in one or more steps, characterised in that the copolymerisation of the diesters with monomers which contain no free COOH groups is carried out in the presence of one or more copolymerisable monomers containing free COOH groups.

Another aspect of the invention is the use of the copolymers obtained as hardenable binders for lacquers and/or coating compositions.

By the copolymerisation with monomers containing COOH groups, according to the invention, it is now possible to obtain products of increased functionality which have better drying characteristics.

The olefinically unsaturated diester containing OH groups which is used in the copolymerisation may be obtained in a two-step reaction, e.g. by esterification of dicarboxylic acid derivatives with polyhydric alcohols and subsequent reaction with epoxide compounds, or in a single step by reacting an anhydride of an olefinically unsaturated dicarboxylic acid, a polyhydric alcohol and a monoepoxide compound. Moreover, according to one particular embodiment of the invention, the reaction mixture containing the diester having OH groups may be mixed with an organic solvent which is inert under the reaction conditions, without any preliminary isolation of the diester, then heated to the desired polymerisation temperature and then copolymerised, in at least one further stage, with unsaturated monomers, with the addition of polymerisation initiators and possibly chain stoppers. This has the advantage of simplifying the process considerably and at the same time saving not only work but also energy.

When the diesters are formed in one step, the temperature is generally 50° to 200°, preferably 100° to 170° C.

In the two-step process, the half ester is prepared in the first step by conventional methods. The reaction of the half ester in the second step is appropriately carried out at 100° to 170°, preferably 120° to 155° C. and generally with equivalent quantities of the monoepoxide compound, since this ensures that the reaction proceeds particularly smoothly; the epoxide groups are split, to form an ester group—and possibly, to a small extent, an ether group—with free OH groups. In this way, a mixed ester of the dicarboxylic acid originally used is obtained, one ester group having free OH groups from the polyhydric alcohol component, whilst the other ester group has free OH groups from the epoxide component. These free OH groups play an important part in the subsequent hardening of the copolymer.

Depending on the desired properties of the intermediate products, the molecular weight and hence the viscosity of the end products can be controlled. Thus, it is possible to obtain monomeric or oligomeric polymerisable intermediate products by a suitable ratio of the OH groups of the starting alcohol to the COOH equivalents of the starting acid.

Examples of dicarboxylic acid anhydrides for the preparation of the diester include the anhydrides of itaconic, citraconic and dimethylmaleic acid, preferably the anhydride of maleic acid. Examples of alcohols include those listed hereinafter. Examples of epoxy compounds include alkylene oxides, such as ethylene oxide, propylene oxide, styrene oxide; glycidol; glycidyl ethers of phenols, such as that of phenol itself, cresols or tert.butylphenol; glycidyl esters of saturated carboxylic acids; but preferably glycidyl esters of branched fatty acids of general formula

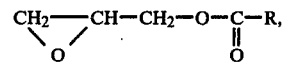

wherein R is the radical of a fatty acid branched in the α position, having 8 to 16, preferably 10 to 12 carbon atoms.

The molecular weight of the diesters is generally within the range from 250 to 1500, preferably 400 to 1250. Depending on the desired end products or the proportion of monomers with free COOH groups, the OH number of the diesters is generally within the range from 175 to 550, preferably 280 to 450.

Copolymerisation of the intermediate products may be effected in one or more, preferably two steps, generally at 80° to 220°, preferably 130 to 170, more particularly 140° to 160° C., possibly without the co-use of solvents. It may be effected thermally. Preferably, however, the work is done in the presence of catalysts, especially radical initiators, more particularly peroxides, e.g. di-tert.butylperoxide, dibenzoylperoxide, cumyl hydroperoxide or azo compounds such as azobis-isobutyronitrile or the like. It may be appropriate to use solvents or diluents, which may be put in first. Suitable solvents include, for example, high-boiling aliphatic and/or aromatic solvents with a boiling point of from 140° to 185° C., such as mineral oil with a boiling point of 160° to 180° C., xylenes, butyl acetate, ethyleneglycol acetate monoethyl ether or the like. If desired, the copolymerisation may also be effected in the presence of chain stoppers such as, for example, alkanethiols such as n-dodecylmercaptan, in order to control the molecular weight.

Examples of suitable copolymerisable monomers with free COOH groups include acrylic and methacrylic acid, half esters of maleic acid, fumaric acid, or itaconic acid, in amounts of generally up to 10, preferably 1 to 3% by weight, based on the total copolymerisable components. Examples of suitable copolymerisable monomers without free COOH groups include aromatic vinyl compounds, such as styrene, α-methylstyrene, or the various vinyltoluenes; acrylic or methacrylic acid esters of monohydric alcohols with 1 to 6, preferably 1 to 4 carbon atoms, such as methyl, ethyl, n- or iso-propyl, n-, sec-, iso- or tert.butyl alcohol; the various pentyl and hexyl acrylates or methacrylates; and also the corresponding monoesters of dihydric alcohols with up to 6 carbon atoms, preferably those with vicinal OH groups, such as hydroxyethyl and hydroxypropyl acrylate and methacrylate. If polymerisation is effected with a monomer mixture, this mixture appropriately contains at least 10 mol-% of aromatic vinyl compounds, preferably styrene, and/or not more than 20, preferably not more than 10 wt.-% of hydroxyalkyl ester, based on the total monomer mixture. Generally, the maximum content of aromatic vinyl compounds is about 50 wt.-%.

The polyhydric alcohols which may be used as components of the acrylic or methacrylic acid esters are the same ones which may be used for the preparation of the half esters, namely, for example, diols such as ethyleneglycol, propanediol-1,2, propanediol-1,3, the various butanediols, such as butanediol-1,4, and pentane- and hexanediols, such as hexanediol-1,6, neopentylglycol, diethyleneglycol and dipropyleneglycol and triols, such as trimethylolethane or -propane. It is also possible to use reaction roducts of polyhydric alcohols, such as glycerol, trimethylolethane and -propane, pentaerythritol and dipentaerythritol, with isocyanate compounds or carboxylic acids, e.g. pentaerythritol diesters with monocarboxylic acids, provided that they contain at least two free OH groups per molecule.

Copolymerisation is appropriately continued until there is a conversion of at least 95%, preferably at least 98%. The acid number of the copolymers may be, for example, 2 to 10, preferably 5 to 40 and the OH number may be, for example, 20 to 280, preferably 50 to 200.

In a preferred embodiment of the process according to the invention, a copolymer is prepared from
(A) 20 to 50 wt.-% of at least one dicarboxylic acid ester, preferably based on maleic anhydride, trimethylolpropane and a glycidyl ester of a branched fatty acid with 8 to 16, preferably 10 to 12 carbon atoms,
(B) 5 to 50 wt.-% of at least one ester of acrylic and/or methacrylic acid with monohydric alcohol groups with 1 to 6, preferably 1 to 4 carbon atoms,
(C) 10 to 50 wt.-% of styrene,
(D) 1 to 3 wt.-% of acrylic acid and,
(E) 0 to 20 wt.-% of at least one ester of acrylic or methacrylic acid with a dihydric alcohol with up to 6 carbon atoms, where the total of A–E is always 100%.

The invention also extends to the curing of the copolymer, for which various curing agents may be used, such as, for example, masked or free polyisocyanates, polycarboxylic acids, preferably in the form of anhydrides, amine resins and phenolic resins. Examples of polyisocyanates include di- to tetrafunctional isocyanates, such as tolylene diisocyanate, isophorone diisocyanate, hexamethylene diisocyanate, 2,4,6-triisocyanatotoluene, 4,4',4''-triisocyanato-triphenylmethane, 2,4,4'-triisocyanato-diphenylmethane, 2,2',5,5'-tetraisocyanato-diphenylmethane and also trivalent isocyanates, which may be obtained, for example, by the addition of trimethylol propane to tolylene diisocyanate, a triisocyanate which may be prepared by reacting hexamethylenediisocyanate and water, or isocyanates with up to 4 free isocyanate groups, such as may be obtained, for example, by reacting tolylene diisocyanate and hexamethylene diisocyanate, or the masked products thereof with acetoacetic acid esters, for example, such as those of methanol, ethanol, propanols or butanols, or with ε-caprolactam.

Examples of polycarboxylic acid hardeners include maleic acid, succinic acid, adipic acid, phthalic acid, trimellitic acid, pyromellitic acid or anhydrides of these acids, as well as low molecular oligomeric esters or polyesters with free COOH groups. If desired, a catalyst may also be added, preferred catalysts being organic metal compounds, such as dibutyl-tin dilaurate, dibutyl-tin oxide, cobalt naphthenate or octoate, or amines such as ethylene diamine and the homologues thereof, such as diethylene triamine, tetraethylene pentamine, tertiary amines, such as triethylamine, tributylamine, dimethylaniline, but preferably alkanolamines, such as diethylethanolamine.

Instead of individual components, mixtures may also be used in all these cases.

The hardening, particularly with polyisocyanates, may be carried out at ambient temperature. At elevated temperature, it is predominantly the other above-mentioned hardeners, including masked isocyanates, which are used, whilst the amine and phenolic resins may also act as hardeners, for example, in the presence of acids, such as toluenesulphonic acid. The thermal hardening is generally effected within 10 to 30 minutes at 120° to 200° C. The addition of catalysts, e.g. organic metal compounds such as dibutyl-tin dilaurate and/or amines, such as tertiary alkanolamine, e.g. diethylethanolamine, may be particularly advantageous when isocyanates are used.

The hardenable binder may also be combined with conventional pigments, fillers and/or additives.

Even if the products obtained according to the invention contain only a minor proportion of hydroxyalkyl esters of unsaturated acids, or even none at all, once they are cured with the suitable curing agents, hardened coatings are obtained which are at least equivalent to the known coatings based on acrylate resins containing hydroxyalkyl esters, but in general the coatings according to the invention are surprisingly superior in their technical coating properties. Thanks to the greater possibility of variation and choice of reaction partners in the production of the copolymers, this invention makes it possible to select the optimum systems for the purpose intended. Moreover, the solubility of the polymers is improved by the incorporation of the unsaturated dicarboxylic acid groups, such as maleic acid esters, in the acrylate-containing systems. As a result, solvent-containing systems can be produced having a higher solids content than was possible with the acrylate resins used hitherto, and the systems are therefore environmentally more acceptable.

The products obtained according to the invention may be used for paints and/or coatings for external use and for linings, and also, for example, as a corrosion proofing for various objects, particularly those which are exposed to atmospheric influences, such as building constructions, vehicles and vehicle parts, e.g. body work and for domestic appliances and electrical equipment and components thereof. They have good adhesion properties to substrates consisting of plastics and metals, such as copper, brass, zinc and iron alloys. Moreover, they have good flow qualities when applied as coatings. The hardened coatings are distinguished by a high gloss, good elasticity, very good weathering resistance and colour stability. The products obtained according to the invention which are hardenable at ambient temperature are particularly suitable for coating construction materials, preferably flooring, e.g. based on cement and concrete. Moreover, the products obtained according to the invention are suitable for use as adhesives, having the advantages of good solubility and consequently a greater solids content.

In the examples which follow, % refers to wt.-% and T refers to parts by weight. The acid number (SZ) and the hydroxyl number (OHZ) were determined in mg KOH for solid resin, and the solids content was determined after 1 hour's drying at 125° C.

EXAMPLES

(1a) Preparation of a mixed ester

134 T of trimethylolpropane, 98 T of maleic anhydride and 245 T of the glycidyl ester of a carboxylic acid with 10 carbon atoms branched in the α-position are heated to 100° C., with stirring. After a short time, the internal temperature rises to 140° C., but after about 30 minutes it falls again. The acid number is then <20. Characteristics of the mixed maleic acid ester: SZ 15, OHZ 350–360.

(1b) Copolymerisation

Polymer A:

To 67 T of ethyleneglycolmonoethylether acetate, at 150° C., with stirring, there is added first a mixture of 38.0 T of the mixed ester of maleic acid prepared in (a), 26.2 T of styrene, 0.5 T of di-tert-butylperoxide and 0.3 T of dodecylmercaptan over 3 hours, and then a mixture of 4.4 T of hydroxyethyl methacrylate, 1.2 T of acrylic acid, 20.7 T of methyl methacrylate, 7.9 T of styrene, 0.5 T of di-tert-butylperoxide and 0.3 T of dodecylmercaptan are also uniformly added over 3 hours. The mixture is then polymerised for 2 hours at 150° C. Characteristics of the copolymer: SZ 17, OHZ 150, solids content 58.6%, viscosity (in 50% xylene) 420 mPa.s.

Polymer B:

17 T of an alkyl-aromatic mineral oil (boiling range 160° to 165° C.), 17 T of butylacetate and 34 T of xylene are heated to 135° to 140° C. At this temperature, first a mixture of 37.9 T of the mixed ester of maleic acid prepared under (1a), then 26.2 T of styrene, 0.5 T of di-tert-butylperoxide and 0.3 T of dodecyl mercaptan are added, with stirring, over 3 hours, and then a mixture of 4.4 T of hydroxyethyl methacrylate, 1.2 T of acrylic acid, 8.0 T of styrene, 20.7 T of methyl methacrylate, 0.5 T of di-tert-butylperoxide and 0.3 T of dodecylmercaptan are also uniformly added over 3 hours. The mixture is then polymerised for 2 hours. Characteristics of the copolymer: SZ 17, OHZ 155, solids content 59.8%, viscosity (in 50% xylene) 1825 mPa.s.

(2) Polymers C, D and E

Maleic anhydride, trimethylolpropane and the glycidyl ester of a carboxylic acid with 10 carbon atoms branched in the α-position are heated to 100° C. with stirring. After a short time, the internal temperature rises to 140° C., but then falls back after about 30 minutes. The SZ of the reaction mixture is then <20. Ethyleneglycol monoethylether acetate is added and the resulting mixture is heated to 150° C.

At this temperature, first a mixture of styrene, initiator and possibly regulator is added uniformly, in batches, over 3 hours, followed by a mixture of one or more esters of (meth)acrylic acid, styrene, (meth)acrylic acid, initiators and optionally regulators, added uniformly in batches over 3 hours. The mixture is polymerised for a further 2 hours.

The mixtures, in parts by weight, and the characteristics of the products are shown in the table which follows.

|  | C | D | E |
|---|---|---|---|
| Maleic anhydride | 4.7 | 4.0 | 3.4 |
| Trimethylol propane | 6.4 | 5.5 | 4.6 |
| Glycidyl ester | 11.7 | 10.0 | 8.4 |
| Ethyleneglycolmonoethylether acetate | 40.0 | 40.0 | 40.0 |
| Styrene | 15.7 | 15.6 | 16.1 |
| Di-tert-butylperoxide | 0.3 | 0.3 | 0.3 |
| Dodecylmercaptan | 0.2 | 0.3 | — |
| Hydroxyethyl methacrylate | 2.7 | 5.3 | 5.6 |
| Methyl methacrylate | 12.4 | 13.0 | 15.7 |
| Acrylic acid | 0.7 | 0.7 | 0.7 |
| Styrene | 4.7 | 4.7 | 4.9 |
| Di-tert-butylperoxide | 0.3 | 0.3 | 0.3 |
| Dodecylmercaptan | 0.2 | 0.3 | — |
| SZ | 19 | 19 | 17 |
| OHZ | 155 | 150 | 140 |
| Solids content % | 59.0 | 58.8 | 60.1 |
| Viscosity (in 50% xylene) mPa · s | 260 | 280 | 370 |

Preparation of the coating compositions

Coating compositions were prepared from the copolymer solutions in accordance with the following formulations:

|  | A | B | C | D | E |
|---|---|---|---|---|---|
| Copolymer solution | 71.40 | 70.77 | 70.77 | 71.38 | 72.80 |
| Dibutyl-tin dilaurate (in 1% xylene) | 0.23 | 0.23 | 0.23 | 0.23 | 0.23 |
| Diethylethanolamine | 0.37 | 0.37 | 0.37 | 0.37 | 0.37 |
| Silicone oil (in 1% xylene) | 0.94 | 0.94 | 0.94 | 0.94 | 0.94 |
| Reaction product of hexamethylenediisocyanate and water, 75% in ethylene- | 27.06 | 27.69 | 27.69 | 27.08 | 25.66 |

|  | A | B | C | D | E |
|---|---|---|---|---|---|
| glycolmonoethyl ether acetate | | | | | |

The polymer solutions are adjusted to a viscosity of 45 s (DIN 53211/20° C.) with a solvent mixture consisting of xylene, a mixture of aromatic hydrocarbons (boiling range 165°–175° C.), butylacetate and ethyleneglycol monoethyl ether acetate (weight ratio 40:25:20:15), and then applied to glass plates and steel sheets in a wet layer thickness of 100 μm. The films are dried in air at ambient temperature.

Technical tests on the coating compositions

The test results are shown in the following table:

|  | A | B | C | D | E |
|---|---|---|---|---|---|
| Bone dry, [min] | 26 | 21 | 22 | 20 | 18 |
| Drying till no longer tacky, min. | 110 | 90 | 130 | 120 | 70 |
| Pendulum hardness [s], according to König, DIN 53157 after 27 hours | 82 | 85 | 74 | 75 | 90 |
| Erichsen cupping DIN 53156 after 10 days [mm] | 8.8 | 9.0 | 9.2 | 9.0 | 8.7 |
| Petroleum resistance, [min] after 10 days | >30 | >30 | >30 | >30 | >30 |
| Solids content [%] | 54.8 | 50.4 | 58.4 | 56.7 | 54.8 |

Discussion of the results

The preceding table shows the rapid drying of the products, with a relatively high solids content.

We claim:

1. A process for the manufacture of hardenable copolymers which comprises reacting at least one olefinically unsaturated dicarboxylic acid or an anhydride thereof with a polyhydric alcohol and a monoepoxide compound in at least one step, to yield an olefinically unsaturated diester containing OH groups and copolymerising this diester with a combination of (a) at least one copolymerisable monomer which contains no free COOH groups and (b) at least one copolymerisable monomer containing free COOH groups.

2. A process as claimed in claim 1, wherein the polymerisation is carried out with a mixture of monomers containing up to 10 weight-% of at least one copolymerisable monomer which contains COOH groups, and not more than 10 weight-% of hydroxyalkyl ester, the weight-% being based on the total weight of copolymerisable components.

3. A process as claimed in claim 1, wherein the olefinically unsaturated diester containing OH groups is obtained in a single step by reacting an anhydride of an olefinically unsaturated dicarboxylic acid, a polyhydric alcohol and a monoepoxide compound.

4. A process as claimed in claim 1, wherein a copolymer is prepared from
    (A) 20 to 50 weight-% of at least one dicarboxylic acid ester,
    (B) 5 to 50 weight-% of at least one ester selected from the group consisting of acrylic and methacrylic acid esters with monohydric alcohols with 1 to 6 carbon atoms,
    (C) 10 to 50 weight-% of styrene,
    (D) 1 to 3 weight-% of acrylic acid and,
    (E) 0 to 20 weight-% of at least one ester selected from the group consisting of acrylic and methacrylic acid esters with dihydric alcohols with up 6 carbon atoms, where the total of A–E is always 100%.

5. A process as claimed in claim 4, wherein component A is based on maleic anhydride, trimethylolpropane and a glycidyl ester of a branched fatty acid with 8 to 16 carbon atoms.

6. A process as claimed in claim 1, wherein the polymerisation is carried out so that the acid number of the copolymers is from 2 to 100 and the hydroxy number is from 20 to 280.

7. A coating composition containing the copolymer prepared by the process of claim 1 as a hardenable binder together with a polyisocyanate as a hardener.

8. A coating composition of claim 7 containing a further catalyst for hardening.

9. A coating obtained from a coating composition of claim 7.

10. A coating composition as claimed in claim 8, wherein the catalyst is selected from the group consisting of at least one organic metal compound and amine.

* * * * *